H. STEPHENSON & V. E. STANLEY.
AUTOMATIC HEADLIGHT CONTROL.
APPLICATION FILED APR. 1, 1918.
1,277,498. Patented Sept. 3, 1918.
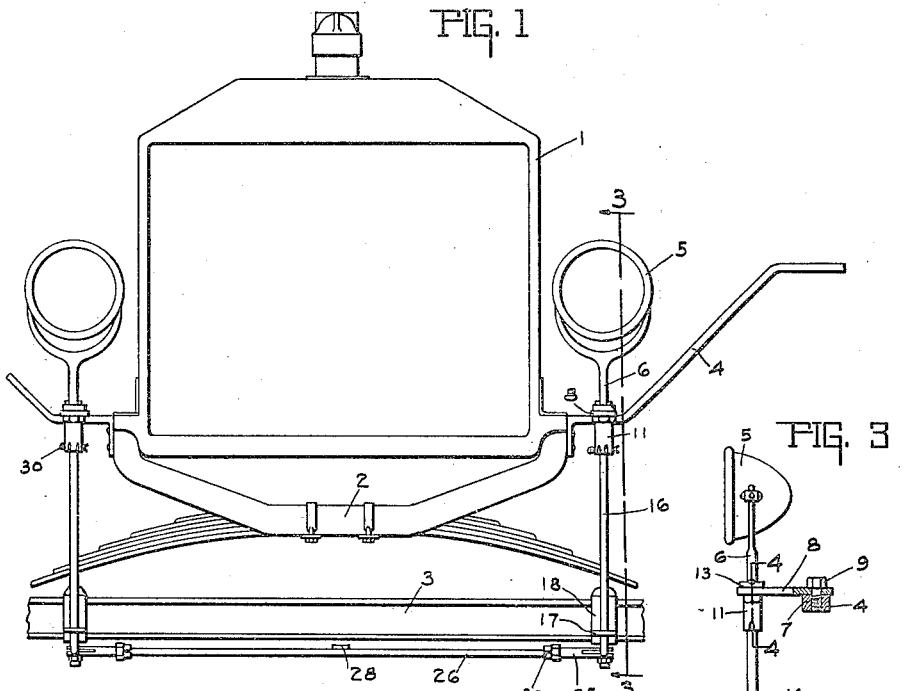
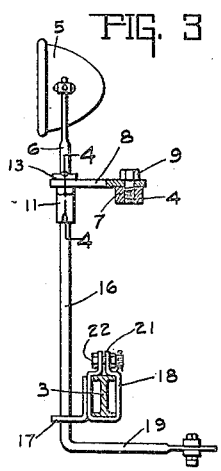
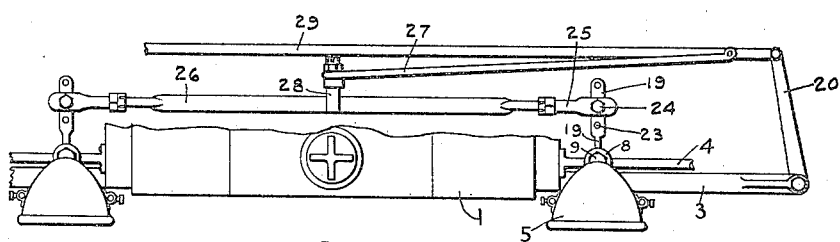
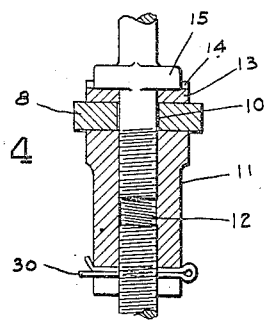
INVENTOR
HOWARD STEPHENSON
VIEL E. STANLEY
BY
ATTORNEYS.

UNITED STATES PATENT OFFICE.

HOWARD STEPHENSON, OF CARTERSBURG, AND VIRL E. STANLEY, OF PLAINFIELD, INDIANA.

AUTOMATIC HEADLIGHT CONTROL.

1,277,498. Specification of Letters Patent. Patented Sept. 3, 1918.

Application filed April 1, 1918. Serial No. 226,027.

*To all whom it may concern:*

Be it known that we, HOWARD STEPHENSON and VIRL E. STANLEY, citizens of the United States and residents of Cartersburg and Plainfield, respectively, county of Hendricks, and State of Indiana, have invented a certain new and useful Automatic Headlight Control; and we do hereby declare that the following is a full, clear, and exact description thereof, reference being had to the accompanying drawings, in which like letters refer to like parts.

This invention relates to automatic headlight control for automobile and other vehicle lights and the prime feature of the invention is the provision of means in connection with the steering mechanism of the vehicle for turning the headlights so that they will project their rays in the line of travel of the front wheels of the vehicle at all times. A further feature of the invention is the provision of means for mounting the controlling means upon the vehicle. A further feature of the invention is the provision of adjustable means for maintaining the lights in alinement with the front wheels of the vehicle, and a further feature of the invention is the provision of means for attaching the controlling means to the steering mechanism of the vehicle.

The full nature of the invention will be understood from the accompanying drawings and the following description and claims.

In the drawings, Figure 1 is a front elevation of an automobile of the Ford type showing the controlling mechanism attached thereto. Fig. 2 is a detailed top plan view thereof. Fig. 3 is a vertical sectional view, as seen on line 3—3 of Fig. 1. Fig. 4 is an enlarged detailed sectional view, as seen on the line 4—4 of Fig. 3.

Referring to the drawings in which similar reference numerals designate corresponding parts throughout the several views, 1 indicates the radiator of an automobile, 2 indicates the supporting frame therefor, and 3 indicates the front axle of the vehicle, all of which parts may be constructed in any preferred manner, but in the present instance are such as are used in the manufacture of Ford cars.

In cars of this class, brace arms 4 are attached to the frame member 2 and are employed for attaching the mud guards, not shown, to the vehicle, and it is customary to mount the headlights 5 on these brace arms by extending the lower ends of the brackets 6 through openings 7 in the brace arms 4, the upper ends of the brackets supporting the headlights 5.

In attaching this device, however, it is necessary to advance the position of the headlights and their supporting brackets which is accomplished by providing straps 8, the inner ends of which are secured to the brace arms 4 by extending bolts 9 downwardly through the straps and into the openings 7. As best shown in Fig. 4 of the drawings, the threaded ends of the brackets 6 are extended through openings 10 at the forward ends of the straps 8 and are entered into the upper ends of couplings 11, said couplings having central bores 12 which are interiorly threaded. Above the straps 8 are washers 13 having transverse channels 14 in which fit lugs 15 attached to the brackets 6.

In order to control said headlights and cause the same to revolve and project their rays of light in the line of travel of the forward wheels of the vehicle, vertically extending standards 16 are threaded into the lower ends of the couplings 11, the lower portions of said standards extending through plates 17 carried by clamping straps 18, the extreme lower ends of the standards having right angular extensions 19 by means of which they are attached to the steering arm 20 of the vehicle. The clamping straps 18 are made of spring metal so that they can be sprung open and slipped around the axle 3 of the vehicle, the ends of the clamping straps having ears 21 through which are extended bolts 22 for tightly clamping them upon the axle.

The free ends of the extensions 19 are provided with a plurality of openings 23 and attached to said extensions 19 by means of bolts 24 are split couplings 25, the inner ends of which are threaded upon the ends of a connecting bar 26 and by properly adjusting the split couplings upon the bar, the lights can be so adjusted with respect to the forward wheels of the vehicle that they will always project the rays of light therefrom in line with the travel of said wheels. In order to cause the standards and headlights carried thereby to swivel with the movement of the forward wheels of the vehicle, a pitman 27 is attached at one end to a stud 28 carried by the connecting bar 26 and at its opposite end to a steering rod 29 so that as the wheels are shifted through the medium of the steering rod 29, the headlights will be likewise rotated through the medium of the pitman 27 as it is caused to travel back and forth with the movement of the steering rod. As best shown in Fig. 4, after the parts of the controlling mechanism are properly adjusted, they are secured and held in their adjusted position by means of cotter pins 30, thus holding all of the parts in properly adjusted position until such time as it is desired to change the same.

It will be understood, of course, that this device is to be used in connection with any make of machine or vehicle and may be attached thereto without changing any of the parts of the vehicle. It will also be seen that the action of the headlights will be positive and by mounting the headlights upon the standards and mounting the lower portions of the standards through the plates 17, the body of the vehicle and headlights may move upwardly and downwardly without affecting the parts of the controlling mechanism.

The invention claimed is:

1. In an automatic headlight control, the combination with a vehicle having an axle and brace arms thereon, of clamping straps adapted to be secured on said axle, plates carried by said clamping straps, standards slidably mounted through said plates, brackets pivoted on said brace arms, couplings connecting said standards and brackets, headlights carried by said brackets, and means to rotate said standards to control the projection of the rays of light from the headlights.

2. The combination with a vehicle having an axle, brace arms, and a steering mechanism, of a pair of rotatable vertically movable standards, a pair of headlights, brackets for supporting said headlights, straps attached to said brace arms through which said brackets extend, couplings for securing the upper ends of the standards and the lower ends of the brackets together, and means connected to the lower ends of the standards and the steering mechanism for rotating said standards and headlights when the steering mechanism is operated.

3. The combination with a vehicle having an axle and steering mechanism, of a pair of standards, clamping straps attached to said axle, plates carried by said straps through which the standards extend, headlights for said vehicle, brackets carrying said headlights, couplings for connecting the meeting ends of said standards and brackets, straps for connecting said brackets to parts of the vehicle, a connecting bar attached to the ends of said standards, and a pitman connecting said bar to the steering mechanism of the vehicle.

4. The combination with a vehicle, headlights therefor, an axle, and a steering mechanism, of brackets for supporting said headlights, straps extending forwardly from the vehicle through which said brackets extend and pivot, standards in vertical alinement with said brackets and couplings for attaching the standards to the brackets, means for holding the standards in spaced relation with the axle, extensions on said standards, a bar connecting said extensions, and means for connecting said bar with the steering mechanism of the vehicle.

In witness whereof, we have hereunto affixed our signatures.

HOWARD STEPHENSON.
VIRL E. STANLEY.

Copies of this patent may be obtained for five cents each, by addressing the "Commissioner of Patents, Washington, D. C."